US012670606B2

(12) United States Patent (10) Patent No.: US 12,670,606 B2

Mccoy et al. (45) Date of Patent: Jun. 30, 2026

(54) SYSTEMS AND METHODS FOR VIDEO DATA DEPTH DETERMINATION AND VIDEO MODIFICATION

(71) Applicant: Sony Interactive Entertainment LLC, San Mateo, CA (US)

(72) Inventors: Charles Mccoy, San Diego, CA (US); True Xiong, San Diego, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 580 days.

(21) Appl. No.: 18/162,680

(22) Filed: Jan. 31, 2023

(65) Prior Publication Data

US 2024/0257369 A1 Aug. 1, 2024

(51) Int. Cl.
*G06K 9/00* (2022.01)
*A63F 13/52* (2014.01)
*G06T 7/50* (2017.01)
*G06V 10/74* (2022.01)

(52) U.S. Cl.
CPC .............. *G06T 7/50* (2017.01); *A63F 13/52* (2014.09); *G06V 10/761* (2022.01); *G06V 2201/07* (2022.01)

(58) Field of Classification Search
CPC ......... G06T 7/50; A63F 13/52; G06V 10/761; G06V 2201/07
See application file for complete search history.

(56) References Cited

U.S. PATENT DOCUMENTS

| | | | | |
|---|---|---|---|---|
| 2010/0046837 A1* | 2/2010 | Boughorbel | .............. | G06T 7/50 |
| | | | | 382/173 |
| 2011/0249886 A1* | 10/2011 | Park | ..................... | H04N 13/261 |
| | | | | 382/199 |
| 2012/0056874 A1* | 3/2012 | Kim | ..................... | H04N 13/271 |
| | | | | 345/419 |
| 2012/0176477 A1* | 7/2012 | Givon | ..................... | G06T 17/00 |
| | | | | 348/46 |

(Continued)

OTHER PUBLICATIONS

International Search Report dated May 1, 2024 in International Application No. PCT/US24/13654.

(Continued)

*Primary Examiner* — Avinash Yentrapati
(74) *Attorney, Agent, or Firm* — Fish & Richardson P.C.

(57) ABSTRACT

System, process, and device configurations are provided for identifying depth of gaming elements. A method can include detecting at least one game object in video data, wherein the at least one game object is a display element and determining a depth parameter for the at least one game object, wherein the depth parameter is a distance value of the at least one game object relative to at least one background display element for the video data. The video data may be output using the depth parameter for the at least one game object. Embodiments can create title specific data from analysis of rendered video data to determine modifications for adding depth and modifying rendering of titles. Depth determinations can include features to allow for different rendering styles and presentation in a three-dimensional format or by a headset. Processes and configurations are also provided for generating contextual information about game objects.

20 Claims, 5 Drawing Sheets

(56) References Cited

U.S. PATENT DOCUMENTS

| | | | | |
|---|---|---|---|---|
| 2012/0274634 A1* | 11/2012 | Yamada | ......... | G06T 7/187 |
| | | | | 345/419 |
| 2015/0117777 A1* | 4/2015 | Hsun | ......... | G06T 7/50 |
| | | | | 382/173 |
| 2017/0124717 A1* | 5/2017 | Baruch | ......... | G06T 7/136 |
| 2018/0020188 A1* | 1/2018 | Eldar | ......... | G06T 5/77 |
| 2018/0070007 A1* | 3/2018 | Molgaard | ......... | G06V 10/28 |
| 2020/0082599 A1* | 3/2020 | Manzari | ......... | G06T 7/50 |
| 2020/0105003 A1* | 4/2020 | Stauber | ......... | G06T 7/50 |
| 2020/0289922 A1* | 9/2020 | McCoy | ......... | A63F 13/65 |
| 2022/0070385 A1* | 3/2022 | Van Os | ......... | H04N 23/62 |
| 2023/0005230 A1* | 1/2023 | Fersund | ......... | G06T 19/20 |
| 2023/0143034 A1* | 5/2023 | Wu | ......... | G06T 3/20 |
| | | | | 345/423 |
| 2023/0196797 A1* | 6/2023 | Addison | ......... | G06T 7/50 |
| | | | | 382/103 |
| 2023/0226998 A1* | 7/2023 | Ali | ......... | G06T 7/11 |
| | | | | 340/426.1 |
| 2023/0237718 A1* | 7/2023 | Philip | ......... | G06T 7/50 |
| | | | | 345/426 |
| 2023/0419526 A1* | 12/2023 | Lianos | ......... | G06T 7/50 |
| 2024/0046709 A1* | 2/2024 | Patil | ......... | G06V 40/172 |
| 2024/0127528 A1* | 4/2024 | Lu | ......... | H04N 5/272 |
| 2024/0161405 A1* | 5/2024 | Mech | ......... | G06T 19/20 |
| 2024/0378789 A1* | 11/2024 | Varekamp | ......... | G06T 7/55 |
| 2024/0394893 A1* | 11/2024 | Qi | ......... | G06T 7/194 |
| 2025/0022212 A1* | 1/2025 | Brandt | ......... | H04N 21/6437 |

OTHER PUBLICATIONS

Written Opinion dated May 1, 2024 in International Application No. PCT/US24/13654.

* cited by examiner

SYSTEMS AND METHODS FOR VIDEO DATA DEPTH DETERMINATION AND VIDEO MODIFICATION

FIELD

The present disclosure is directed to processing of video data, such as electronic game data, and processing of data including electronic game data, rendering game data, gaming device operations, gaming device processes and video presentation.

BACKGROUND

Computer and console games titles have been developed in many styles for different gaming systems and platforms. Games and content are often developed for display in a two-dimensional format. With the advancement of displays and developments in game and media viewing there is a desire for enhancement of content and to allow for content presentation in additional formats. One difficulty arises from the format and rendering style of the game content, especially legacy content. There is also a desire to for operations and systems that allow for enhancement of two-dimensional content.

Similarly, video data streams are often transmitted for presentation on a flat display with little ability to enhance content. Enhancing of rendered video content may be difficult apart from color adjustments that may be made to an entire display output, such as changes in contrast or brightness. There is a desire for objects in video data to be presented to enhance presentation of objects.

BRIEF SUMMARY OF THE EMBODIMENTS

Disclosed and described herein are systems, methods and configurations for identifying depth of gaming elements. In one embodiment, a method includes detecting, by a device, at least one game object in video data, wherein the at least one game object is a display element. The method includes determining, by the device, a depth parameter for the at least one game object, wherein the depth parameter is a distance value of the at least one game object relative to at least one background display element for the video data. The method also includes outputting, by the device, the video data using the depth parameter for the at least one game object.

In one embodiment, detecting the at least one game object of the video data includes decoding video data using at least one trained object identification parameter.

In one embodiment, the object is detected in rendered two-dimensional video data, the video data including a graphical background.

In one embodiment, the depth parameter identifies order of the at least one game object relative to a graphical background of the video data based on pixel overlap of the object to the graphical background.

In one embodiment, the depth parameter is determined based on overlap of at least one additional game element with the at least one game object.

In one embodiment, the depth parameter is determined based on a rendering style of the video data.

In one embodiment, the depth parameter is value for modifying presentation of the at least one game object relative to a graphical background of the video data.

In one embodiment, outputting the video data includes updating a display configuration from a two-dimensional display configuration to a three-dimensional display configuration including updating position of elements with respect to a plurality of planes.

In one embodiment, outputting the video data includes updating presentation of the object using the depth parameter to distance the object from a graphical background using the depth parameter for the at least one game object.

In one embodiment, the method includes generating at least one of object identification data and object order data for the video data based on training operations for a media title.

Another embodiment is directed to a device configured for identifying depth of game elements. The device includes an interface and memory storing executable instructions and a controller, coupled to the interface and memory. The controller is configured to detect at least one game object in video data, wherein the at least one game object is a display element. The controller is also configured to determine a depth parameter for the at least one game object, wherein the depth parameter is a distance value of the at least one game object relative to at least one background display element for the video data. The controller is configured to output the video data using the depth parameter for the at least one game object.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
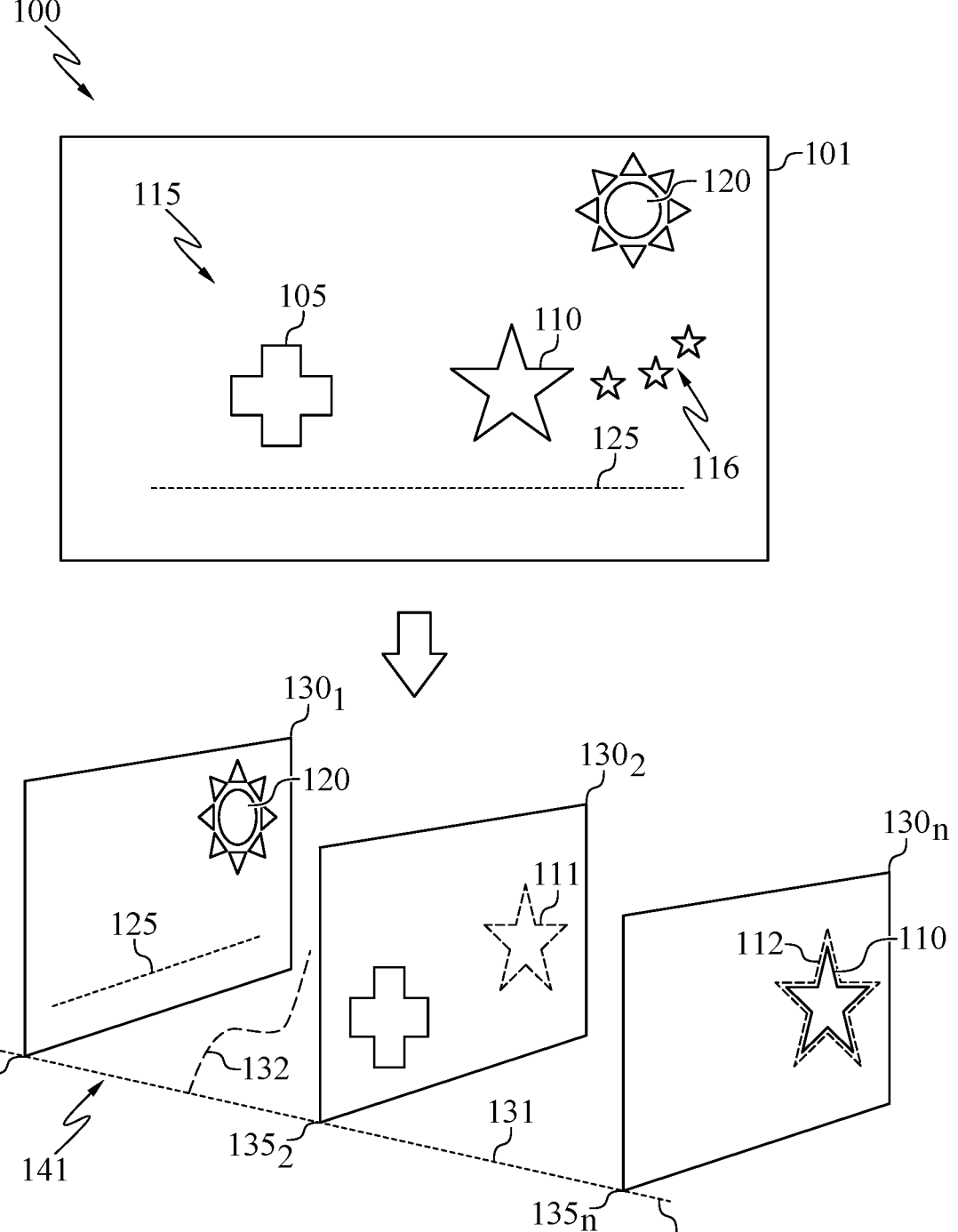
FIG. 1 is a graphical representation of identifying depth of gaming elements according to one or more embodiments.

One aspect of the disclosure is directed to identifying depth of gaming elements and objects in video data. Embodiments are directed to gaming systems which may include consoles, processors or servers that generate game media. In many cases, content is generated for two dimensional displays. Processes, system configurations and device configurations according to embodiments are provided to allow gaming systems and media players to identify depth of gaming elements and display elements. According to embodiments, gaming objects in video data may be detected and at least one depth parameter may be determined for gaming objects. The depth parameter may be used by a device for presentation of content including the gaming object using the at least one depth parameter. Embodiments may be employed for modifying presentation of two-dimensional (2D) content on a display using depth determinations. Embodiments may also be used for presentation of 2D content by wearable devices and/or devices configured for wearable use, such as a head mounted display (HMD) or three-dimensional (3D) display.

Embodiments described herein include processes, device configurations and systems for determining depth determinations and for use of depth determinations for presentation of content. According to embodiments, configurations are provided for devices to receive video content, such as rendered gaming content, and to determine depth determinations for one or more gaming objects. Embodiments may also be used to determine depth determinations for video content, such as live sports, cartoons, and videos in general. Configurations are provided to use depth determinations for modification of the presentation format of video data on a display. According to embodiments, 2D video content may be modified to allow for a 3D modification to the video output. According to embodiments, presentation of content may be performed for head mounted applications, such as virtual reality headsets, gaming headsets and head mounted media presentations in general. Embodiments may be applied to rendered video data, such as video data for presentation on a display. Embodiments may also be used for modification of graphical output by a gaming engine or gaming console configured to output gamine content.

According to embodiments, depth determinations may be one or more reference values or parameters determined for one or more display objects and for different display object types. Depth determinations may be relative, such that objects may have a depth value or distance from the background. In other embodiments, depth determinations may be an association of objects relative to one or more planes. In each of these examples, the depth determinations may include one or more values of characteristics that may be identified and used by a device, such as a gaming console and/or media player, to present content using the depth determinations. For example with a side scrolling video game, a depth may be identified for a player controlled character, such that presentation of the character may be output as having a raised depth for the character relative to one or more other portions of the display output, such as background imagery. Depth determinations may be identified for player controlled element, non-player controlled elements and even background or elements that are part of game scenery. According to other embodiments, object depth may be determined to include identification of one or more planes or distances for display of an object. Depth determinations may also provide an order characterization for the gaming object relative to one or more other elements.

According to embodiments, a depth determination is a determination for an object to be presented in 3D compared to a 2D representation of rendered video. Depth determinations may include one or more of a determination of order, a reference point for rendering, and identification of a plane for display. Depth determinations may be determined separate from a game engine that generates or renders graphics. According to embodiments, depth and distance determinations relate to parameters for modifying display characteristics of graphical elements of content. For gaming content in a side-scrolling format, the depth determinations allow for an order to be assigned to display elements such that one or more display elements appear in a modified format. Game pathways and platforms in this example can appear to be closer (or further) to a user or views perspective once modified. Similarly a player controlled character may appear closer (or further) from a user/viewers perspective. Rendering of a 2D side scrolling game does not provide distance or depth of characters, only the pixel output for elements. One or more parameters are provided herein for determining a depth and/or assigning a distance to content.

Embodiments described herein include processes, device configurations and systems for training operations and models to determine depth of gaming and display objects. Processes and device configurations can include operations for error correction of object identification, model updating and generation of a database of gaming objects.

Embodiments are also directed to systems, devices and methods for identification of objects in video data for enhancing viewing experiences. Principles for depth determinations for gaming objects may be used to determine depth determinations of video objects in video media including sporting elements in live sports, scenery in landscape and structures and video content in general.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

FIG. 1 is a graphical representation of identifying depth of gaming elements according to one or more embodiments. FIG. 1 illustrates display 100 presenting content in display window 101. According to embodiments, devices and processes described herein may be configured to receive content, such as rendered video data and detect objects in the video data. Embodiments are described herein as having one or more applications, include detection of objects in gaming video data and detection off objects in video data in general, such as product placements. Processes and device configurations may run gaming content and may decode rendered video data for display or output. Embodiments discussed herein refer to adding depth to gaming objects as one example. It should be appreciated that embodiments may be applied to non-gaming objects including but not limited to broadcast video/television content and video data in general.

Embodiments include detecting at least one game object in video data. Video data can include captured imagery and generated imagery (e.g., animated content). Gaming content may be presented in one or more frames with each frame including one or more elements such as a player controlled object, a non-player character, a background object, or an environmental object. Display window 101 includes an exemplary representation of video content, such as gaming content, including object 105, object 110 and object 120. Objects in display window 101 may be presentenced with a background 115 including one or more elements. Gameplay environments may include non-player controlled objects or graphical outputs, such as elements 116 associated with game play. Similarly, levels, paths, walkways, and game play barriers, shown generally as game element 125, may also be present as part of the background 115 and/or as a game object. Due to traditional displays being largely two-dimensional outputs and semi-two dimensional in the case of a curved display, content is often generated for two-dimensional representation. Embodiments provide device configurations and processes to add depth to displayed elements by detecting at least one game object as a display element and to determining a depth parameter for the at least one game object. Operations discussed herein may be performed on rendered video data, such that a device or process does not have to access, recreate, or modify a game engine.

Content of video data, such as content in display window 101, may have one or more game objects or elements. The game objects may move position in multiple frames, and/or may be associated with a fixed position relative to one or more frames. Identification of gaming objects may include identifying one or more game elements from video data, such as rendered video data and identification of position. Systems, processes, and device configurations are provided for identifying depth of gaming elements.

Objects in display window 101 may be player controlled or non-player controlled objects. Identification of objects, such as object 105, may be based on one or more trained parameters for object identification. Depth determinations may be based on object order and/or overlap. According to embodiments, changes to object shape, due to overlap or two objects appearing in the same space may be used to infer an order of the objects. For example, when object 105 relates to a player controlled object moving along object 125, which may be a pathway, a depth may be assigned for object 125 to appear in the background and/or object 105 to appear a distance from the background. Depth determinations may be based on multiple objects identified. Similarly, depth determinations may detect a scene having a similar pattern across frames, such that the scenery may be associated with a depth in connection with its association as a background.

According to embodiments, a depth determination may be made for one or more identified objects. The depth determination may include identifying depth or relative depth of objects that are rendered by a game engine. Determining depth information about game objects allows objects to be rendered such that the depth differences can be seen. According to embodiments, a depth determination may be an inference of objects relative position. By way of example, for two objects in a video frame or set of frames, a depth determination may identify an object that covers another object. The covering or overlap of objects can signal a display order, such that the object in front covers the other object. As such, the depth determination may include identification of an order of elements. According to embodiments, interaction between one or more objects can signal display depth. As another example, if two objects bounce off of each other when they move such that their boundaries intersect or touch, a depth determination may identify that the two objects occupy the same depth. According to embodiments, depth determinations may be a depth or distance value for presenting an object a distance from a reference point, such as a background. When modifying display of an object using a depth parameter, the object may appear raised or as a three-dimensional projection from the background. Identifying depth for at least one object may include assigning a depth parameter that provides a distance value of the at least one game object relative to at least one background display element for the video data. The video data may be output using the depth parameter for the at least one game object. Embodiments can create title specific data from analysis of rendered video data to identify objects, determine modifications for adding depth, and to modify rendering of game titles using the depth parameters. Depth determinations can include features to allow for different rendering styles and presentation in a three-dimensional format, by a headset, or by a head mounted display (HMD). In addition, depth determinations allow for operations to be applied to a stream of data or video without necessarily having access to a gaming engine or rendering engine. Processes and configurations are also provided for generating contextual information about game objects.

According to embodiments and as discussed herein, depth determinations may be determined based on the style and/or format of content. By way of example, depth determinations may be performed for a sideways scrolling game may identify one or more of depth and order based on item overlap. For a first-person game, depth determinations may be determined based on one or more of object overlap, object size, and perspective characteristics for objects.

FIG. 1 illustrates an example representation of depth determinations for objects in display window 101. According to embodiments, identifying objects may include identification of one or more of object 105, object 110 and object 120. Similarly, one or more objects in display window 101 may detected as being part of background 115 or a gameplay environment, such as element 116 and game element 125. A process according to embodiments may determine a depth parameter for each object using one or more frames of video data. According to embodiments, depth parameters for objects may be used for multiple frames. Depth parameters may be updated for an object for different frames.

According to embodiments, a depth determination includes an identification, selection, or assignment of a plane, such as one or more of planes $130_{1-n}$, to one or more objects. As shown in FIG. 1, a depth determination for object 120 and object 125 is associated with plane $130_1$, a depth determination for object 105 is associated with plane $130_2$, and a depth determination for object 110 is associated with plane $130_n$. Planes $130_{1-n}$ may relate to display planes for a device, such as a head mounted device, that may be configured to present content, such as gaming content, to appear as being located and/or associated with one or more viewing planes. Planes $130_{1-n}$ may be rectangular planar display windows. According to embodiments, planes $130_{1-n}$ may include a curved or non-planar shape, such as configuration 132. According to embodiments, each plane may be associated with a distance reference 140. Distance reference 140 may include a distance or perceived distance from a reference point, such as a background or foreground for display. According to embodiments, objects may include display characteristics across one or more planes. By way of example, object 110 may be presented and/or identified with plan $130_n$, and include one or more display characteristics in display pane $130_2$, such as display characteristics 111. Display characteristics 111 may be a shadow, highlight or other graphical treatment in general. Display characteristics 111 may trailing objects, such as projecting elements of game element 116.

According to embodiments, a depth determination includes identification of a distance, such as one or more of distances $135_{1-n}$. As shown in FIG. 1, a depth determination for object 120 and object 125 is associated with distance $135_1$, a distance determination for object 105 is associated with distance $135_2$, and a distance determination for object 110 is associated with distance $135_n$. According to embodiments, distances $135_{1-n}$ are separated by at least one increment 141, such that objects in a first distance (e.g., distance $135_1$) appear separated from objects in a second distance (e.g., distance $135_2$). Distances $135_{1-n}$ may be relative to distance reference 131. Distances $135_{1-n}$ may be relative to distance reference 140, which may relate to a viewing point of a user. Depth determinations may include identification of a plane and a distance determination relative to a distance reference. FIG. 1 illustrates an exemplary configuration including distance $135_1$ being associated with plane $130_1$, distance $135_2$ being associated with plane $130_2$, and distance $135_n$ being associated with plane $130_n$. Depth determinations and distances may be used to present and/or modify 2D elements. Presentation with a distance, depth or order may also include modification of object size (e.g., increase or decrease) based on the distance and/or depth determined. Modification of 2D content can include conversion of elements to a 3D representation or output which can include use of one or more planes. In plane $130_n$, for example, object 110 may optionally include one or more graphical treatments 112 to convert flat rendering of the object to appear raised and/or to differentiation from other planes. According to embodiments, graphical treatment 112 may include adjusting pixel display characteristics to modify borders of elements, change size, and/or perspective of an element.

According to embodiments, depth determinations may be determined for game status indicators. Many game styles display game status indicators, such as scores, health indicators, inventory indicators, or maps, rendered on in front of the rendering of other game elements. Determination of such game status indicators can be made based on game style and display of the elements. Game status indicators can be assigned a depth that causes them to be rendered in front of other game elements when the game elements are rendered in a 3D display.

According to embodiments, depth determinations of game elements can be made based on the relative changes in how game elements are rendered as perspective changes. Movement of the camera positioning relative to game elements, such as in a game rendered from a first-person perspective, will change the perspective in which the game elements are shown. As an example, if a player in a first-person perspective game turns their head to the right, game elements that are farther from the camera position will move more than game elements that are closer to the camera position. As another example, if a player in a first-person perspective game moves forward, game elements that are closer to the camera position will move more than game elements that are farther from the camera position. As a further example, in a side scroller style game as the game rendering slides sideways game elements that are farther away may slide slower than other game elements, such as a background that scrolls slower than foreground elements. Depth parameter determination according to embodiments may detect and utilize the relative changes in game elements.

FIG. 1 is discussed with reference to gaming objects. It should be appreciated that the principles of the disclosure similarly apply to non-gaming objects and video data in general. By way of example, objects detected in content may include one or more product placements. As such, graphical elements, advertisements, branded symbols and text may be identified and a depth determination may be determined for the product placement. According to embodiments, presentation of the graphical elements may be based on depth determinations for the product placement. When objects are sporting games, the depth determinations may be determined for gameplay elements, such as the ball, scoring area (e.g., hoop, backboard, goal posts, net, etc.). Alternatively, structural elements such as a scoreboard, scoring area, and barriers may be objects for depth determinations. In addition, graphical overlays for video data may be detected and modified. As such, depth determinations can be made for sporting games and sporting videos, and the depth determinations may be used for presentation of the game object.

FIG. 1 illustrates content in display window 101 that represents one or more frames of video data. Embodiments may be applied to multiple rendering styles for video data including common game rendering styles. Gaming content may be rendered using one or more styles of drawing a game. Different styles of rending may use different treatments to illustrate the gaming objects and gaming environment. Embodiments can include identifying a rendering style and identifying depth parameters to add depth to display of the game rendering. Embodiments can also include detecting elements and/or graphical characteristics of the rendering style for modification.

According to embodiments, processes and device configurations can detect and/or identify a rendering style from one or more of detected video data, detected objects, and object training. Some games may not be rendered using a realistic perspective. For example, a game may be rendered as if the camera is directly above the game board looking down upon it, but the graphics of the game pieces shown on the game board may be drawn from a perspective that shows one of the sides of the game piece. In some cases, shadows of game elements are shown as a large and darkened blob instead of corresponding to a shape of the game element casting the shadow. In such cases, a three-dimensional representation of such a rendering may look unnatural as the original was not created with a natural perspective. Accordingly, embodiments may utilize modifications that work well with a detected rendering style.

According to embodiments, depth parameters may be determined for a flat rendering style and one or more depth parameters for objects may be modified in output of video content. A flat rendering style may include elements drawn in a two-dimensional rendering with no perspective. The rendering may have some implied depth, such as shadows on buttons or a character graphic with shadows to imply that the character is three dimensional. Commonly, shadows or shading are used to indicate an item sticking up from the base plane.

According to embodiments, depth parameters may be determined for a top-down rendering style and one or more depth parameters for objects may be modified in output of video content. A top-down rendering style may include elements rendered as if looking straight down on the game, such as a dungeon exploration game with a square grid representing the dungeon being explored. A top-down rendering style may be similar to a flat rendering style, except that in many cases the game is rendered as a base plane with items sitting on the base plane, such as walls or monsters. In a top-down rendering, if characters moving on the game base plane cannot move through an area of the game map, then that area can be drawn raised from the base plane to visually indicate that it is a barrier to movement of characters. In some cases, such as a non-traversable area of the map representing a river flowing through the map, input to a device or processes may receive input to indicate that the depth of the non-traversable area of the map should be rendered with a lower depth than that of the base plane to look correct.

According to embodiments, depth parameters may be determined for a front view rendering style and one or more depth parameters for objects may be modified in output of video content. A front view rendering style may include elements rendered with a camera angle looking straight ahead at a scene. The scene can be static, like a fighting game or a game that shows one room at a time. The scene can move, such as a side-scrolled game. In many games all the action happens in a single plane. In some games action can happen in a small number of planes. In some games there is a lot of movement forwards and backwards in the view.

According to embodiments, depth parameters may be determined for a front view with floor rendering style and one or more depth parameters for objects may be modified in output of video content. A front view with floor may be similar to the front view, except that the bottom part of the screen represents a base plane under other game objects, such as the characters in the game. In many cases the characters are all in a single plane on top of the base plane. In some cases, the characters may move closer to or farther away, in which case the depth of game objects can be determined by how low on the screen the base of the object is on the screen, with the bottom of the screen representing the portion of the base plane that is closest to the camera view.

According to embodiments, depth parameters may be determined for an angled down view rendering style and one or more depth parameters for objects may be modified in output of video content. An angled down view rendering style may relate to a camera view for the rendering that appears to look down and/or view downward upon the main character. The downward view may be at an angle, such as a 30°-45° angle. The game play rendering is designed to show a three-dimensional game play area, but is rendered in two-dimensions.

In the angled down view, the rendering may be of a three-dimensional model or may be drawn by drawing graphics on the screen. The camera view may follow the main character or may be fixed in relationship to the background. The camera view is more likely to follow the main character when the view is a rendering of an internal three-dimensional model. In some cases, the game area that is being viewed is a grid that is not in perspective with the viewing angle, with each grid space being the same dimensions regardless of how far from the camera view the grid space is drawn. This can make it easier to draw game objects on a grid as the same graphic can be drawn in any grid space without scaling based on the distance from the camera view. In such a rendering, objects higher up on the screen can be displayed as being farther away in a three-dimensional representation of the game rendering, in which case those objects will look larger than the objects that are closer due to the unnatural perspective in which the original rendering was created with. Processes and device configurations described herein can detect an angled down view rendering and compensate for it by scaling the farther away game elements to be smaller, so they appear to be drawn to scale.

According to embodiments, depth parameters may be determined for a first-person view rendering style and one or more depth parameters for objects may be modified in output of video content. A first-person view rendering style may include a view that the main character would have when moving through the game environment. This view may be usually rendered based on an internal three-dimensional model of the game environment. When the rendering is based on an internal three-dimensional model of the game world rendered in two-dimensions from a particular camera view then the movements of game objects on the screen relative to the camera view movements can be used to reverse engineer the three-dimensional model of the game world. The reverse engineered three-dimensional model can be used to determine the depth of game objects on the screen to convert the game rendering to a three-dimensional display. For example, If the camera stays in the same position, but rotates, objects that are farther away will move more than objects that are closer, giving precise information about the depth of objects that are visible in the rendering. As another example, if the camera stays pointed in the same direction, but moves, such as a first-person view from a character that jumps up or starts walking forward, then objects closer to the camera move more than objects that are farther away from the camera.

For a first-person view, graphics moving in the game rendering may pass in front of other graphics, then the graphics should be rendered with a closer depth than the other graphics that they pass in front of. For example, a bird flying over a map of terrain may fly over a wall that blocks the movement of the main character. If the bird graphic has consistent behavior of being in front of other graphics when it is displayed, then the meta-data about the game title can indicate that the graphic for the bird should be displayed with a depth that is closer to the camera view. In the same example with a rendering where terrain is viewed from above, such as a top-down view, the bird should be rendered closer that the wall it flies over.

According to embodiments, depth parameters may be determined for product placements and one or more depth parameters for objects may be modified in output of video content. Product placements may in game renderings, such as original renderings, can be recognized. In some cases, the product placement in the game will represent a real-world product, such as a particular brand of soft drink. In some cases, the product placement in the game will represent a generic place holder for a product, such as a brown bottle to represent a beverage. An identified product placement can be rendered to put more emphasis, such as rendering the game element closer in the field of view. According to embodiments, modification of video content can include swapping an identified product placement with a rendering of another product, such as a product placement that was sold more recently. Such product placements can be used to swap out old or dated products with modern products that will resonate better with the player. The modification of product placements can be customized to the preferences of a player or spectator viewing the rendering.

Figure 2:
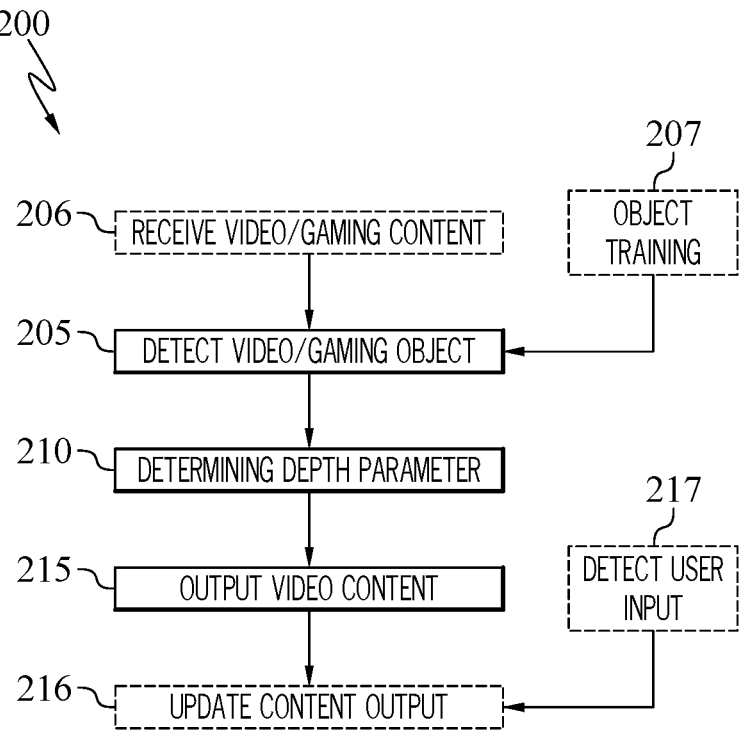
FIG. 2 illustrates a process for identifying depth of gaming elements according to one or more embodiments.

FIG. 2 illustrates a process for identifying depth of gaming elements according to one or more embodiments. Process 200 may provide depth determinations for use in modifying and/or presenting content, such as gaming content, gaming video and video data in general. Process 200 may be performed by a device, such as device 305 and/or controller 325 of FIG. 3, for at least one of identifying and using depth determinations. Process 200 may be initiated by a device (e.g., device 305) detecting at least one game object in video data at block 205. According to embodiments, the at least one game object is a display element in video data, such as a gaming element. Processes and configurations described herein allow for detection of objects from rendered video data, such that access to a game engine or rending engine are not required. As such, operations and configurations are not dependent on running a game engine to detect game objects.

Process 200 may include detecting at least one game object in video data, such as at least one of video and gaming objects, at block 205. The at least one game object may be a display element and process 200 may include determining a depth parameter for the at least one game object. Detection of an object may include detection of set of pixels which or other video characteristics to identify the object from rendered video data. By way of example, an object, such as a gaming object may be detected in rendered two-dimensional video data, the video data including a graphical background. The gaming objects may change position, such as the display position in frames of video data, accordingly, detection of a video or gaming object may include identification of object position within a frame.

Detection of gaming objects at block 205 can include detection of a plurality of objects. By identification of multiple objects, process 200 can use the one or more objects to determine depth. According to embodiments, detecting at least one game object of the video data includes decoding video data using at least one trained object identification parameter. Detection of an object may be based on one or more models of objects. Detection of objects may also be based on models determined for a game or video data from learning data.

According to embodiments, detecting video and gaming objects at block 206 can include analysis of the video data to characterize gameplay. Video data may be analyzed at block 205 for identification of objects using pixel, shape and color analysis. According to embodiments, parameters describing characteristics of rendering styles may be used as models and references to identify at least one of a rendering style and object of the video data. When an object is identified, stored reference objects associated with an identified object may be used to characterize the object in the video data. Objects may be identified for one or more categories including background, game play objects, interactive or game environment objects, barrier elements/paths, etc. Analysis at block 205 can also include detecting an order of presentation for elements on screen such that multiple depths per object may be identified.

According to embodiments, process 200 may optionally include receiving video/gaming content at block 206. Video and/or gaming data may be received from a source or decoded from media. In certain embodiments, a controller performing process 200 may decode video data from media or include video/gaming content in memory. Optionally receiving video/gaming content may include receiving rendered video data from one or more sources. When performed by a display device or a media player, process 200 may receive video/gaming content from internal memory and/or by way of one or more network connections.

According to embodiments, process 200 may optionally include object training at block 207. Object training at block 207 may be performed to refine models for object identification and for training depth determinations. Based on object training, one or more models may include parameters to identify an object. Object training may include receiving training data, such as video streams of game play or video data in general and using the training data to identify object characteristics. Object training may be based on a specific media type, such as a particular game title or style and/or a type of sporting event. Object training may be performed for generating at least one of object identification data and object order data for the video data based on training operations for a media title. Object training is described below with reference to FIG. 5. According to embodiments, object training at optional block 207 may be based on a specific game title. A model of the specific game title may identify objects of the game, background elements and display elements in general. Object training can include detection of one or more overlap sequences for identified objects to aid in identifying object depth.

According to embodiments, object training at block 207 can use generate title specific data for determining three-dimensional rendering from rendered video data. Object training can include analysis of game play of a game title and use that data to determine modifications to add depth to the two-dimensional rendering of that game title during game play. For example, for a game including two objects that start in different places, object training can detect when the two objects move to the point where they overlap. As such, overlap of one object with the other may be detected. By using analysis from one or more previous game play sessions, during game play that data can be used to set the relative depth of those two objects correctly before they move to overlap. According to embodiments, object training may be performed across many players or across game sessions of the player who is playing. By analyzing across many players, object training can advantageously allow for data to be available the first time a player gets to a new portion of the game. Object training may also allow for generating contextual information about the depth for game objects. For example, a first game object may be in front of a second game object in a first room of the game while the second game object may be in front of the first game object when in a second room of the game.

At block 210, a depth parameter may be determined for the at least one game object. According to embodiments, a depth parameter is a distance value of the at least one game object relative to at least one background display element for the video data. Depth parameters may be determined as a distance from a background for the purpose of presenting the object as a raised element in a wearable display. According to embodiments, a depth parameter identifies order of the at least one game object relative to a graphical background of the video data based on pixel overlap of the object to the graphical background. Order may be determined based on a series of frames of video data including the presentation order or layers where some objects may overlap or obstruct other objects. The depth parameter may be determined based on overlap of at least one additional game element with the at least one game object.

Determining the depth parameters may be based on rendering styles of video data. Process 200 may account for one or more rendering styles, including flat, top down, front view, front view with floor, angled down view and first person view. At block 205, process 200 can include determining a rendering style of video data. Based on a determined rendering style, a depth parameter is determined may be determined. The parameters and characteristics of the depth determination may be based on the rendering style of the video data. For example, in a flat view, the depth parameter may provide an indication of order. In a first person view, the depth parameter may provide an indication of position with respect to a three-dimensional coordinate system. Depth parameters may provide values for modifying graphical elements, such as for modifying the presentation distance for at least one object. With respect to head mounted or displays configured to provide depth or space, the depth parameter may provide one or more parameters for distancing the at least one game object relative to a graphical background of the video data and/or one or more objects of the video data.

According to embodiments, one or more factors may be used to determine depth of game elements at block 210 of process 200. These one or more factors may be used for legacy video games to determine depth when a game engine is not accessible and/or not configured to output depth data. Process 200 at block 210 may determine how to add depth information to the two-dimensional rendering of a game and can detect features and characteristics of video data to improve depth determinations. By way of example, characteristics such as graphic size, including graphic elements rendered smaller when farther away and larger when closer may be detected. Similarly, if an object in the game casts a shadow on another object, then depth determination can include a determination or inference of a spatial relationship between the two objects based on the shadow. Another characteristic may be detecting use of a gradient on portions of the rendering that fade into the distance to give a player viewing the two-dimensional rendering of the game a sense of depth. Such a gradient can reduce the color saturation of the graphics as the get farther away, such as a mountain range fading into the haze in the distance. Alternatively, such a gradient can change in brightness as it gets farther away, such as a cave wall fading into the darkness as it gets farther away from the light source. Another feature that may be detected is rendering of game objects with perspective, even if that perspective is drawn into a two-dimensional graphic that is shown in the game rendering. For example, a crate can be drawn with its sides being trapezoidal so that its far end is slightly smaller than its near end to correlate to the perspective of seeing a three-dimensional crate. Such perspective in game graphics can be used to determine depth information for those game graphics.

At block 215, video data may be output using the depth parameter for the at least one game object. The video data may be output using the depth parameter for the at least one game object. Embodiments can create title specific data from analysis of rendered video data to determine modifications for adding depth and modifying rendering of titles. Depth determinations can include features to allow for different rendering styles and presentation in a three-dimensional format or by a headset. According to embodiments, presentation of the video data may be modified. By way of example, a gaming object may be modified in its appearance to include a depth parameter. Similarly, one or more parameters for the object may be modified based on the rendering style.

At block 215, outputting the video data can include output of video data using the depth parameter. For example, output of video data can include updating a display configuration from a two-dimensional display configuration to a three-dimensional display configuration including updating position of elements to with respect to a plurality of planes. According to embodiments, outputting video data at block 215 updating presentation of the object using the depth parameter to distance the object from a graphical background using the depth parameter for the at least one game object.

Output of the object may include modifying video data convert pixels associated with an object in the video data to be set to a depth based on a determined depth for the object. One modification may be to increase size of an object and or change object shape based on the depth parameter. Depth parameters may provide a conversion or mapping type for to use to convert/modify 2D representation to 3D.

Processes and configurations are also provided for generating contextual information about game objects. According to embodiments, objects such as advertisements or graphics may be detected and a depth parameter may be used to accentuate and/or modify presentation of the object.

Process 200 may optionally include updating content output at block 216. Content may be updated based on the video content received. For example, an object position may change in the received video data and process 200 may update the depth parameter for the object. As such the presentation of the object may be adjusted to account for changes in the depth parameter.

According to embodiments, process 200 may receive feedback on the presentation of content. By way of example a user may rate and/or provide feedback on content presentation. Process 200 may optionally include detecting user input at block 217. User input may be detected at block 217 and may be used for updating content output at optional block 216. According to embodiments, user input to correct or modify object presentation may be used to modify depth parameters by process 200. According to embodiments, a user interface selection may be detected during display of a menu of a gaming system or a game. Similarly, a menu or user interface selection may be detected for receiving feedback of non-gaming video data.

According to embodiments, detected user input at optional block 217 may provide rendering quality feedback including monitoring of player reactions to rendering modifications of the game to determine the quality of the choices it made for the depths at which game objects were rendered. By way of example, if a particular game object confuses the player, feedback may be provided that the object might not have been rendered at the correct depth. Information about potential rendering depth errors can be fed back into process 200 at optional block 217. Different versions of a model can be tested, player reaction may be detected. Measurements and adjustments can be performed across a large number of users to create a model that works well for most players. According to embodiments, detecting user input at optional block 217 may allow players to explicitly indicate when an error in the rendering depth of a game object has been made. Feedback may be aggregated across many players to determine when the same error has been reported multiple times. In addition, a model for depth parameter and video modification may be updated to correct errors that were reported by multiple players.

According to embodiments, depth parameters may be determined and used to modify video content by process 200 for game spectators. By way of example, depth may be added to a two-dimensional game rendering to produce a three-dimensional game rendering for spectators as well as, or instead of, for the player playing the game. Pre-recorded two-dimensional recordings of game play may have depth information added so that they can be played back in a three-dimensional manner, such as in an HMD or on a 3D TV, when being viewed by a spectator. Process 200 may determine three-dimensional rendering effects that may be different for different spectators of the same game play rendering. For example, some spectators need more separation to be able to comfortable see depth information. Some spectators may want a more subtle 3D treatment, such as to reduce eye strain. Some spectators may wish to view the content in the original two-dimensional format, even when other spectators may be viewing the content in a three-dimensional format.

Figure 3:
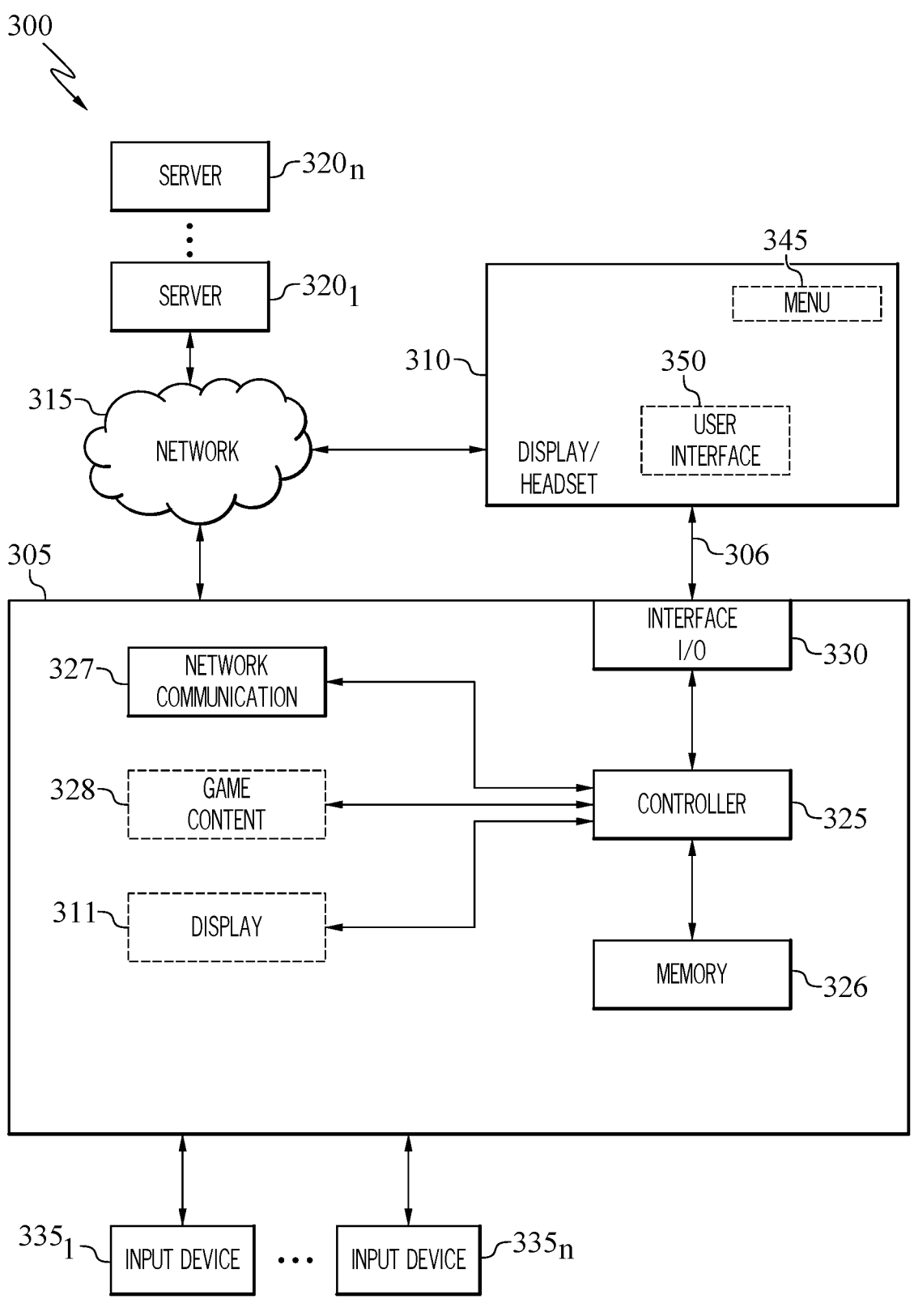
FIG. 3 illustrates a graphical representation of a system and device for identifying depth of game elements according to one or more embodiments.

FIG. 3 illustrates a graphical representation of a system and device for identifying depth of game elements according to one or more embodiments. According to embodiments, depth determinations may be determined and used by the device or a system, such as a network gaming system. A system can include one or more components and devices. FIG. 3 illustrates system 300 according to embodiments which can include device 305. Device 305 may be one or more of a gaming console, computing device and electronic device in general configured to output gaming content 306 to a display and may include output of game guide elements and game guide content. With respect to gaming content, device 305 may be configured to output data for presentation by a display, or visual output device in general, including graphics (2D and 3D), sound and data. Device 305 may also be configured to output non-gaming content, such as video content, visual content, audio content, etc. Embodiments describe generating dynamic gaming music for electronic games and gaming, however it should be appreciated that the principles of the disclosure may be applied to other forms of media and non-gaming content. As such, device 305 and system 300 may be used to identify depth of video objects for one or more applications.

According to embodiments, device 305 is configured to output data 306 and/or content to display 310. According to embodiments, display 310 may be separate from or part of device 305. Device 305 may be configured for network communication by way of network 315 with one or more servers $320_{1-n}$, Network communication can include one or more network communication type (e.g., Local Area Network (LAN), Metropolitan Area Network (MAN), Wide Area Network (WAN), Wireless, Inter Network (Internet). Device 305 may be configured to receive one or more of user data, game data and video data from servers $320_{1-n}$, Servers $320_{1-n}$ may be configured to store one or more of user data, game data and game guide data.

FIG. 3 depicts a device configuration according to embodiments. Device 305 may relate to a console, media device, and/or handheld device. Device 305 may be configured to modify video data using one or more depth determinations. According to embodiments, device 305 includes controller 325, and memory 326. Device 305 may also include network communication module 327. Device 305 may also optionally include game content 328. Device 3050 may optionally include a display 311 and/or may interoperate with display 310.

Controller 325 may relate to a processor or control device configured to execute one or more operations (e.g., executable instructions) stored in memory 326, such as processes for identifying and using depth of game elements. Controller 305 may be coupled to memory 326, network communication module 327, and interface (I/O) 330. Memory 326 may be non-transitory memory configured to provide data storage and working memory operations for device 305. Memory 326 may be configured to store computer readable instructions for execution by controller 325 for one or more processes described herein. Network communication module 327 may be a communications module configured to receive and transmit network communication data. According to one embodiment, controller 325 may be configured to output the video data using at least one depth parameter for the at least one game object.

Device 305 may be configured to receive gaming media (e.g., card, cartridge, disk, etc.) and output visual and audio content of the gaming media to display 310. Device 305 may be configured to receive data from one or more of servers $320_{1-n}$ to present and output game content 328, which may be stored in memory 326. For network games, device 305 may receive game data from a network source, such as servers $320_{1-n}$, and may be configured to generate gaming music for the game data. Device 305 may similarly be configured to receive video content in general, including non-network game data, and output video content.

Device 305 may be configured to receive input from one or more peripheral devices, such as input devices $335_{1-n}$. Input devices $335_{1-n}$ may be controllers or input devices in general configured to provide controls for device 305 and game control.

System 300 may include display 310 for output of visual and audio of an electronic game and/or output of device 305. According to embodiments, display 310 may display control elements of device 305, such as optional menu 350, which may be used to interface with device 305. Display 310 may output user interface 350 received from device 305. Device 300 may utilize one or more operations of processes described herein. It should also be appreciated that system 300 and its components may be configured to perform operations of device 305.

Figure 4:
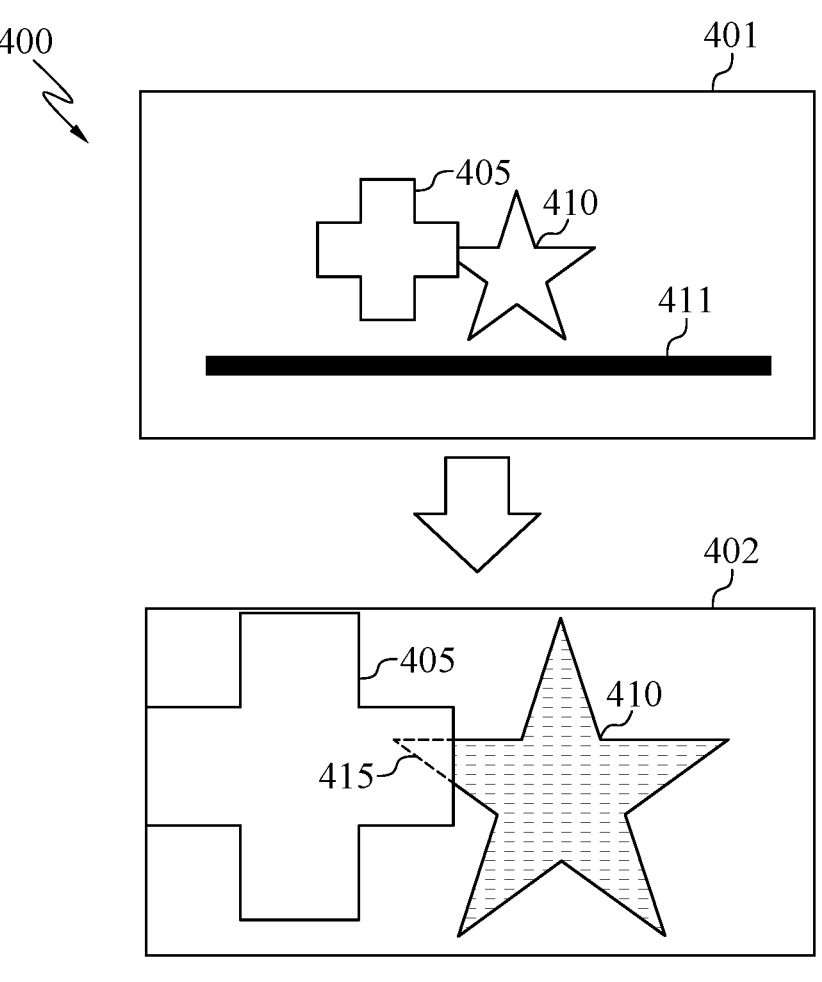
FIG. 4 illustrates a graphical representation of gaming elements and depth determination according to one or more embodiments.

FIG. 4 illustrates a graphical representation of gaming elements and depth determination according to one or more embodiments. According to embodiments, a depth determination may be based on one or more of order and mapping of elements in a gameplay environment. With two-dimensional or flat renderings, object order may be identified based on object overlap. According to embodiments, depth determinations of objects may include identification of an object, including the object boundary or shape. In certain embodiments, pixels associated with the object may be identified. FIG. 4 illustrates an exemplary representation of determining object depth using object order. Operations described in FIG. 4 may be performed by a device for video data 400. Video data 400 relates to at least one frame of video data and is shown relative to a display window 401. According to embodiments, object order may be determined for a plurality of frames. Video data 400 includes a first object, object 405, and a second object, object 410. Video data 400 may also include a barrier element 411. Barrier element 411 may relate to an element that is displayed in one or more frames in a fixed position. In a gaming context barrier element 411 may relate to a platform, border, or wall by which objects may be moved across or on. According to embodiments, on object depth determination may identify an object that appears in front of other objects, and thus, an object that appears in front of other objects. An object depth parameter may also identify an object that appears between a front or top object and elements in a background. According to embodiments, object depth may be determined from rendered video data by detecting overlap of objects. FIG. 4 illustrates portion 402 showing an enlarged view of object 405 and object 410 including overlapping portion 415. In portion 402, object 405 overlap object 410 by at least portion 415. According to embodiments, processes described herein may detect the objects, such as object 405 and object 410 and detect overlap portion 415. Based on the overlap portion, object 405 may be determined to be in front of object 410. Pixel overlap may be determined based on multiple frames, including one or more preceding or following frames that show objects 410 and 415 without overlap. According to embodiments a depth determination for object 410, for example, may indicate object 405 as having a position and order relative to one or more objects of display window 401, such as appearing in front of object 410. According to embodiments, a depth parameter may indicate or highlight a depth for display of the object in modified representation. As such, configurations described herein may detect overlap portion 415 and determine object 405 as having a depth of display that is elevated with respect to one or more of other objects, such as object 410, and the background. In such a scenario, object order may not be explicitly determined. However, it should be appreciated that a depth parameter may determine order and depth of display.

According to embodiments, depth determinations may be performed for each object in display window 401. In addition, depth determinations may include object identification within display window. A depth parameter may be assigned to objects that are persistent, such as barrier 411 and objects that change position or characteristics over one or more frames. Depth may be determined based on detecting a moving object and persistent object. For example, object 405 may move position and barrier 411 may be associated with a particular position relative to one or more other elements of display window 401. Accordingly, a depth determination for object 405 may relate to a raised height and barrier 411 may include a depth parameter that is one or more of behind and in association with a background element.

Figure 5:
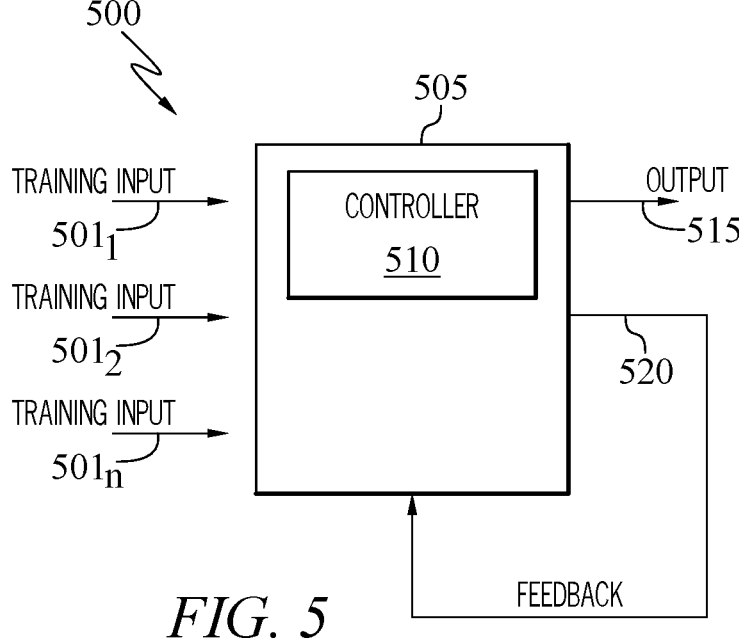
FIG. 5 illustrates a graphical representation of depth training according to one or more embodiments.

FIG. 5 illustrates a graphical representation of depth training according to one or more embodiments. According to embodiments, depth determinations may be performed using one or more references and models. Contextual information for objects and object depth may be determined based on a training process. FIG. 5 illustrates training process 500 which can include receiving training input 501$_{1-n}$ by a device 505 including a controller 510. According to embodiments, controller 510 may receive a plurality of game play videos for one or more game titles as training input 501$_{1-n}$. In embodiments, training input 501$_{1-n}$ may relate to rendered video data for a particular title. Based on the training in process 500, controller 510 may generate output 515. Output 515 may include one or more object identification parameters, such as shapes, colors, pixel mappings and display locations that may be used for identification of an object. Output 515 may also provide one or more of object depth and object order relative to video data and one or more objects in a display window. According to embodiments, controller 510 may be configured to generate output 515 based on a recursive loop including training and feedback. Feedback loop 520 may provide information such as ratings and accuracy for output 515.

According to embodiments, training process 500 and controller 510 may be configured to use one or more learning models (e.g., artificial intelligence, iterative models, etc.) to recognize objects and elements in a two-dimensional game rendering to determine depth information for those objects. Training process 500 and controller 510 may use one or more libraries of common objects, including object images and three-dimensional characteristics. By way of example, objects, including but not limited to stairs, ladders, trees, or cars that may be common in game renderings, may include three-dimensional representations linked to one or more two-dimensional representations.

According to embodiments, training process 500 and controller 510 may be configured to detect objects with 900 angles. These objects may be common in games, such as crates, windows, and corners of rooms. Recognizing that an angle in a rendering likely represents an angle that is 90° in the three-dimensional game model that the rendering is trying to represent allows information about the three-dimensional game model to be reverse engineered.

According to embodiments, training process 500 and controller 510 may be configured to detect graphics such as humanoids, animals, birds, or insects are common in game renderings. These shapes can be recognized by training process 500 and controller 510 and correlated to real world objects in certain poses in three-dimensional space to create a three-dimensional map of what the source for the two-dimensional rendering could have been generated to represent. The movement of such graphics can also be analyzed to determine a three-dimensional model of the object the graphic is intended to represent. Training process 500 and controller 510 may be configured to identify common background game elements, such as tall buildings or mountains. Such game elements that were identified as being in the distance can be rendered with a large depth. Training process 500 and controller 510 may be configured to model and train a model for a particular game title to recognize background elements that are specific to that game title. Training process 500 and controller 510 may be configured to identify static game elements, such as overlays giving health status. Such areas of the game rendering can be given a depth to be in front of most of the rest of the game rendering. Game element renderings can displayed as rendered at the same depth to give them a consistent appearance as being game elements instead of being objects in the game world. In some cases, shadows, or other visual clues, can be added to enhance the illusion that the game elements are in front of the game world rendering.

According to embodiments, output 515 may include output of video modified to account for one or more depth parameters. Depth training may include receiving user feedback as part of feedback loop 520 for title specific data and on three-dimensional representations of the two-dimensional output. For example, for a result of three-dimensional output, feedback loop 520 can indicate corrections to depth for the video data that game objects are rendered. Feedback loop 520 can generate metadata that can allow for rendering corrections.

Training process 500 and controller 510 may be configured to determine depth parameters for game titles rendered with unnatural perspectives, in which case feedback 520, which may be user feedback, may be required to try out different rendering depths for various game objects to determine modifications that may be most natural to a human observer. Training process 500 and controller 510 may be configured to detect elements in games that are ambiguous as to their depth from the movement and interactions of the game objects. In many cases these game objects are intended to look like particular real-world objects to a player. In such a case a human can recognize the game objects and determine depth parameters to modify display of the game objects.

According to embodiments, the rendering style can be determined and taken into account in training. The rendering style determination can be made by analysis of the training data, or the rendering style determination may be indicated, such as through a user interface used to provide the training data. As an example, if it is determined that the game is rendered in a style that is a top-down view of a dungeon map, then the training may determine that the rendered objects are icons drawn as if viewed from above. Furthermore, in a top-down view of a dungeon map icons are typically drawn on a grid with the same icon being drawn in multiple grid spaces. Typically, some icons are used to indicate the static game map, such as walls, floors, and stairs, and other icons are used for items that can move within the game map, such as the main character, a sack of gold, or a sword. As another example, if it is determined that the game is rendered in a first-person perspective, then the training may determine that the rendered objects can be reverse engineered to create a three-dimensional model of the game objects that were rendered to produce the rendered view.

Figure 6:
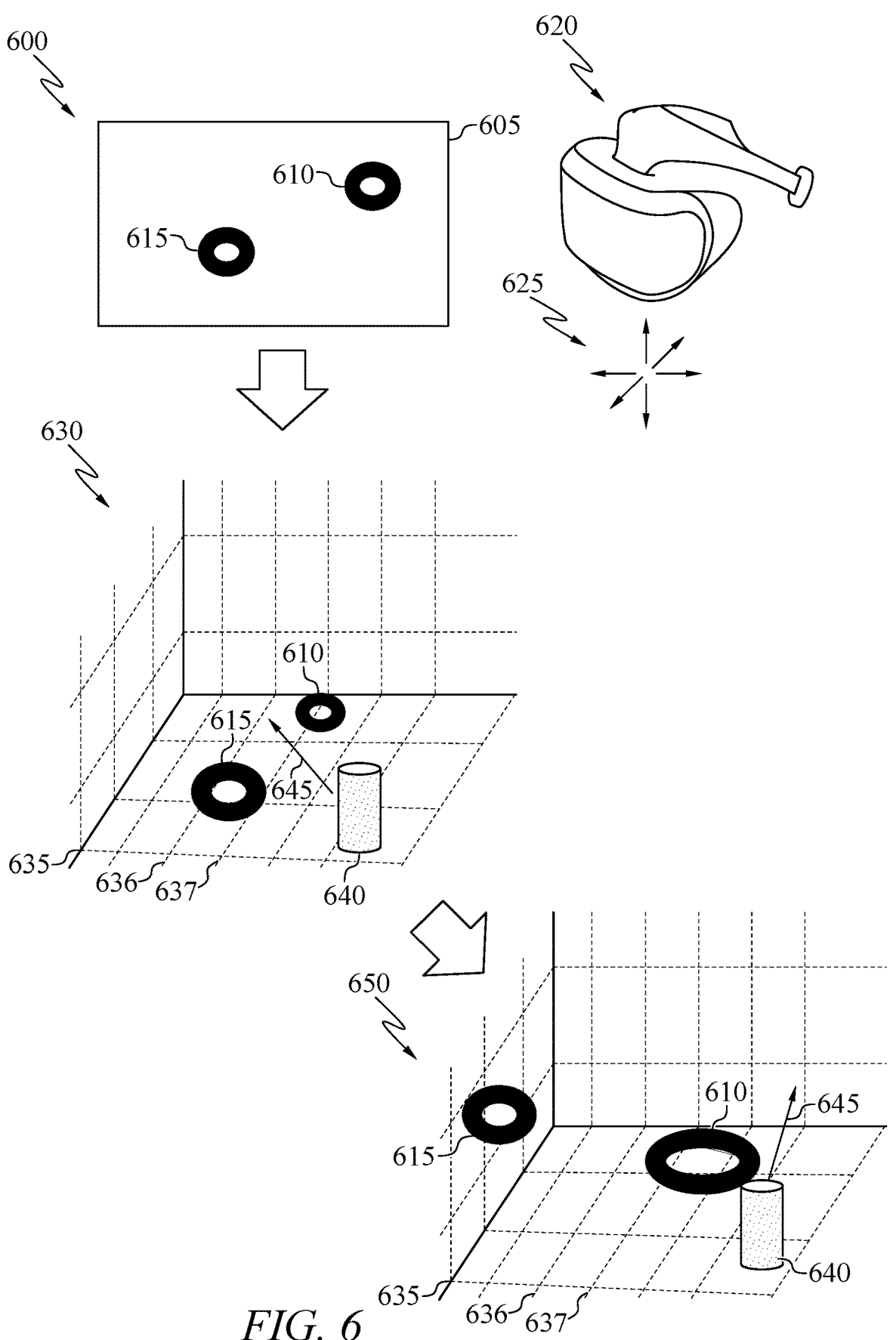
FIG. 6 illustrates a graphical representation of depth determination and training according to one or more embodiments.

FIG. 6 illustrates a graphical representation of depth determination and training according to one or more embodiments. According to embodiments, process 600 may determine depth parameters for video data 605 rendered for a two-dimensional display and use the depth parameters to modify video data 605 for presentation on a three-dimensional display unit. According to embodiments, a depth parameter may provide a location of position for presentation of an object with respect to a coordinate system, such as a two-dimensional coordinate system and three-dimensional coordinate system. By providing depth parameters, video data 605 may be modified for presentation by a device configured to present content in connection with a parameters of display unit 620, which may be head-mounted display or wearable display. Display unit 620 may be configured to update parameters for display based on the orientation direction 625 (e.g., directions in one or more planes) of display unit 620. According to embodiments, object 610 and 615 may be detected by a device and depth parameters may be determined. The depth parameters may be determined based on the object position and characteristics of the object and/or other display elements, such as background elements, additional objects, etc., for one or more frames of video. Process 600 may determine depth parameters including a position for display at 630. At 630, position of object 610 and object 615 may be associated with a coordinate system 635 including a plurality of references, such as grid lines 636 and 637. Grid lines 6236 and 637 may represent one or more depth increments. According to embodiments, multiple depth increments may be assigned or associated with an object. Process 600 may also determine display characteristics relative to a reference position 640 and direction 645. Reference position 640 may relate to a reference point representing the location of a user of display unit and direction 640 may be based on the orientation direction 625 of display unit 620. By way of example, display unit 610 may include a reference position for display of content and detect user movements in direction and/or location to modify the presentation of content such that objects may appear enlarged to show proximity, or smaller to show distance using depth parameters detect from the video data. Process 600 may update the presentation of video data 605 from at 650 based on one or more of a change in direction of display unit 620 and changes in the presentation of video data 605. For example, as objects move from one display position to another, or objects are updated or replaced, object presentation size and location output by display unit 620 may be modified. At 650, object 615 is raised and further away from reference position 640 compared to at 630. In addition, object 610 has increased size and a closer position at 650 compared to process 600 at 630.

According to embodiments, process 600 and device configurations may be configured to modify rendered video data based on a head mounted display (HMD) angle, such as orientation direction 625 of display unit 620. A camera angle of a two-dimensional game rendering can be recognized so that it is shown in an HMD, such as display unit 620, such that it is in the center of the player's view when the angle of the player's head matches the angle of the camera view. For example, if the two-dimensional game rendering were created from a camera angle with the camera looking down at the game play area at a 450 angle, then when the player wearing the HMD moves their head to be looking down at the same angle, they will view the center of the game rendering. According to embodiments, head movements of a player wearing an HMD, such as display unit 620, can be mapped to navigational inputs to drive the game play. For example, if the player turns their head to the right, that head movement can be translated into commands to the game to rotate the camera view, or character in a first-person perspective game, to the right. That way when the game rendering is kept displayed in front of the player, the view that the player has into the game world will shift to show them what is to the right of what they were looking at. According to embodiments, orientation direction 620 may be based on a three-dimensional coordinate plane.

Process 600 may be configured to provide a conversion of two-dimensional content into a three-dimensional space for rendered video data. For content that is presented in a flat rendering style, the treatment of the content may be updated such that pixel areas for objects appear to have a depth and/or can be presented with a three-dimensional format. For content rendered in a first-person or immersive rendering style, objects in the game may be modified to allow for modification of objects to be presented with a depth parameter by display unit 620. Process 600 allows for assigning size of objects relative to a depth parameter. Similarly, the size of an object may be modified based on a viewing angle.

Process 600 is described with reference to coordinates 635, which can include one or more coordinate axis planes as a reference. It should be appreciated that other coordinate systems and location references may be used to allow for modification of content.

While this disclosure has been particularly shown and described with references to exemplary embodiments thereof, it will be understood by those skilled in the art that various changes in form and details may be made therein without departing from the scope of the claimed embodiments.

What is claimed is:

1. A method comprising:
determining, using one or more machine learning models, a rendering style of video data;
detecting, by a device, at least one object in the video data;
determining, by the device, a set of one or more graphical features that indicate depth in the video data based on the determined rendering style of the video data;
determining, by the device, a depth parameter for the at least one object from the rendered video data based on the set of one or more graphical features that indicate depth in the video data;
modifying, by the device and based on the determined rendering style of the video data, the video data using the determined depth parameter for the at least one object; and
outputting, by the device, the modified video data.

2. The method of claim 1, wherein detecting the at least one object of the video data includes decoding at least a part of the video data using at least one trained object identification parameter.

3. The method of claim 1, wherein the depth parameter identifies order of the at least one object relative to a graphical background of the video data based on pixel overlap of the object to the graphical background.

4. The method of claim 1, wherein the depth parameter is determined based on overlap of at least one element with the at least one object.

5. The method of claim 1, wherein the style used in rendering the video data includes at least one of a flat, top down, front view, front view with floor, angled down view, or first person view rendering style.

6. The method of claim 1, wherein the depth parameter includes a value for modifying presentation of the at least one object relative to a graphical background of the video data.

7. The method of claim 1, wherein determining the depth parameter for the at least one object from the rendered video data comprises:

associating a plane, selected from a set of multiple planes each indicating a distance reference, with the at least one object, wherein modifying the video data using the determined depth parameter for the at least one object comprises:

updating a display configuration from a two-dimensional display configuration to a three-dimensional display configuration including updating position of the at least one object based on the associated plane selected from the set of multiple planes.

8. The method of claim 1, wherein modifying the video data using the determined depth parameter comprises:

updating presentation of the object using the depth parameter to distance the object from a graphical background using the depth parameter for the at least one object.

9. The method of claim 1, wherein determining the depth parameter comprises:

providing data representing the rendered video data to the one or more machine learning models, wherein the one or more machine learning models are trained to generate at least one of object identification data or object order data for input video data based on training operations for a media title; and obtaining output from the one or more machine learning models processing the data representing the rendered video data as at least part of the depth parameter.

10. A device comprising:

an interface;

a memory storing executable instructions; and a controller coupled to the interface and the memory, wherein the executable instructions are operable, when executed by the controller, to cause the controller to perform operations comprising:

determining, using one or more machine learning models, a rendering style of video data;

detecting, at least one object in the video data;

determining a set of one or more graphical features that indicate depth in the video data based on the determined rendering style of the video data;

determining a depth parameter for the at least one object from the rendered video data based on the set of one or more graphical features that indicate depth in the video data;

modifying, by the device and based on the determined rendering style of the video data, the video data using the determined depth parameter for the at least one object; and outputting output the modified video data.

11. The device of claim 10, wherein detecting the at least one object of the video data includes decoding at least a part of the video data using at least one trained object identification parameter.

12. The device of claim 10, wherein the object is detected in rendered two-dimensional video data, the video data including a graphical background.

13. The device of claim 10, wherein the depth parameter identifies order of the at least one object relative to a graphical background of the video data based on pixel overlap of the object to the graphical background.

14. The device of claim 10, wherein the depth parameter is determined based on overlap of at least one element with the at least one object.

15. The device of claim 10, wherein the style used in rendering the video data includes at least one of a flat, top down, front view, front view with floor, angled down view, or first person view rendering style.

16. The device of claim 10, wherein the depth parameter includes a value for modifying presentation of the at least one object relative to a graphical background of the video data.

17. The device of claim 10, wherein determining the depth parameter for the at least one object from the rendered video data comprises:

associating a plane, selected from a set of multiple planes each indicating a distance reference, with the at least one object, wherein modifying the video data using the determined depth parameter for the at least one object comprises:

updating a display configuration from a two-dimensional display configuration to a three-dimensional display configuration including updating position of the at least one object based on the associated plane selected from the set of multiple planes.

18. The device of claim 10, wherein modifying the video data using the determined depth parameter comprises:

updating presentation of the object using the depth parameter to distance the object from a graphical background using the depth parameter for the at least one object.

19. The device of claim 10, wherein determining the depth parameter comprises:

providing data representing the rendered video data to the one or more machine learning models, wherein the one or more machine learning models are trained to generate at least one of object identification data or object order data for input video data based on training operations for a media title; and obtaining output from the one or more machine learning models processing the data representing the rendered video data as at least part of the depth parameter.

20. One or more non-transitory computer storage media encoded with computer program instructions that when executed by one or more computers cause the one or more computers to perform operations comprising:

determining, using one or more machine learning models, a rendering style of video data;

detecting, by a device, at least one object in the video data;

determining, by the device, a set of one or more graphical features that indicate depth in the video data based on the determined rendering style of the video data;

determining, by the device, a depth parameter for the at least one object from the rendered video data based on the set of one or more graphical features that indicate depth in the video data;

modifying, by the device and based on the determined rendering style of the video data, the video data using the determined depth parameter for the at least one object; and outputting, by the device, the modified video data.

* * * * *